(12) United States Patent
Wenzel et al.

(10) Patent No.: US 12,246,500 B2
(45) Date of Patent: Mar. 11, 2025

(54) HEATING PRESS AND METHOD FOR VULCANIZING A VEHICLE TIRE IN SAID HEATING PRESS UNDER VACUUM

(71) Applicant: Continental Reifen Deutschland GmbH, Hannover (DE)

(72) Inventors: Karsten Wenzel, Helpsen (DE); Horst Wedekind, Garbsen (DE); Michael Ramm, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 106 days.

(21) Appl. No.: 18/247,883

(22) PCT Filed: Oct. 4, 2021

(86) PCT No.: PCT/DE2021/200144
§ 371 (c)(1),
(2) Date: Apr. 5, 2023

(87) PCT Pub. No.: WO2022/073569
PCT Pub. Date: Apr. 14, 2022

(65) Prior Publication Data
US 2024/0042714 A1   Feb. 8, 2024

(30) Foreign Application Priority Data
Oct. 5, 2020   (DE) .................. 10 2020 212 551.1

(51) Int. Cl.
*B29D 30/06* (2006.01)
(52) U.S. Cl.
CPC ..... *B29D 30/0601* (2013.01); *B29D 30/0605* (2013.01); *B29D 30/0662* (2013.01)
(58) Field of Classification Search
CPC ............................ B29D 30/0605; B29D 30/06
See application file for complete search history.

(56) References Cited

U.S. PATENT DOCUMENTS 4,508,497 A * 4/1985 Beres ................ B29D 30/0605
                                                         425/29
4,563,139 A * 1/1986 Yokoyama ......... B29D 30/0605
                                                         425/32
(Continued)

FOREIGN PATENT DOCUMENTS

CN      117245956 A  * 12/2023  ............. B29C 33/46
DE    102018216754 A1    4/2020
(Continued)

OTHER PUBLICATIONS

The International Search Report and the Written Opinion of the International Searching Authority mailed on Jan. 7, 2022 for the counterpart PCT Application No. PCT/DE2021/200144.

*Primary Examiner* — Benjamin A Schiffman
(74) *Attorney, Agent, or Firm* — Richard A. Wolf; Gregory Adams

(57) ABSTRACT

A heating press (1) for vulcanizing a vehicle tire under a vacuum, having a heating press upper part (3) and a heating press lower part (6), wherein a circular-ring-shaped hood upper part (4) with a container (2) having the mold parts (14, 16, 17, 18, 21) of a vulcanizing mold is arranged on the heating press upper part (3), and wherein the heating press upper part (3) can be moved in an axial direction (P1) in such a way that the hood upper part (3) can be moved onto the heating press lower part (6) to form a closed hood interior space (12), wherein a press plate (23) is arranged above the container (2) in the hood upper part (4) such that this press plate (23) and thus the container (2) can be moved in the axial direction (P1).

11 Claims, 3 Drawing Sheets

(56) References Cited

U.S. PATENT DOCUMENTS

| | | | |
|---|---|---|---|
| 5,145,688 A | 9/1992 | Ohtake | |
| 5,196,206 A * | 3/1993 | Troia | B29C 33/02 425/210 |
| 6,406,360 B1 * | 6/2002 | Nguyen | B24C 3/06 451/92 |
| 6,923,879 B1 * | 8/2005 | Blickwedel | B29D 30/72 156/130.7 |
| 7,056,109 B2 * | 6/2006 | Kata | B29D 30/0629 425/46 |
| 7,527,489 B2 * | 5/2009 | Steinke | B29C 39/42 425/546 |
| 7,963,756 B2 * | 6/2011 | Bachochin | B29D 30/0605 425/46 |
| 10,493,665 B2 * | 12/2019 | Wenzel | B29D 30/0606 |
| 10,821,688 B2 * | 11/2020 | Stoila | B29C 33/202 |
| 11,752,717 B2 * | 9/2023 | Takahashi | B29C 33/02 425/28.1 |
| 2010/0282387 A1 * | 11/2010 | Wenzel | B60C 11/00 152/209.15 |
| 2011/0262572 A1 * | 10/2011 | Fricke | G01J 5/00 425/29 |
| 2022/0143942 A1 * | 5/2022 | Takahashi | B29C 33/10 |
| 2023/0373176 A1 * | 11/2023 | Wenzel | B29D 30/0605 |
| 2023/0373177 A1 * | 11/2023 | Wenzel | B29D 30/0662 |
| 2023/0382067 A1 * | 11/2023 | Wenzel | B29D 30/0662 |
| 2023/0405951 A1 * | 12/2023 | Wenzel | B29D 30/0601 |
| 2024/0173931 A1 * | 5/2024 | Pierre | B29D 30/0605 |

FOREIGN PATENT DOCUMENTS

| | | | |
|---|---|---|---|
| DE | 102023204308 A1 * | 11/2024 | |
| FR | 2980135 A1 | 3/2013 | |
| JP | 2010179638 A * | 8/2010 | |
| WO | WO-2021223822 A1 * | 11/2021 | B29D 30/0601 |

\* cited by examiner

HEATING PRESS AND METHOD FOR VULCANIZING A VEHICLE TIRE IN SAID HEATING PRESS UNDER VACUUM

BACKGROUND OF THE INVENTION

The invention relates to a heating press for vulcanizing a vehicle tire, having a heating press upper part and a heating press lower part, wherein a circular-ring-shaped hood upper part with a container having the mold parts of a vulcanizing mold is arranged on the heating press upper part and wherein the heating press upper part can be moved in an axial direction in such a way that the hood upper part can be moved onto the heating press lower part to form a closed hood interior space.

The heating press upper part and the heating press lower part are connected to the container in such a way that the mold parts of the vulcanizing mold can be closed in a radial direction through a total stroke which takes place in an axial direction.

The invention furthermore relates to a method for vulcanizing a green tire in this abovementioned heating press under vacuum.

The above-described heating press is a standard heating press for vulcanizing vehicle tires under atmospheric conditions.

The heating press comprises a so-called container which comprises the actual segmented vulcanizing mold with the mold segments and sidewall shells and bead rings, which mold the tire. Furthermore, heating chambers are provided for controlling the temperature of the molding parts. During the vulcanization, the container is surrounded by a closed hood which, in the prior art, serves primarily for temperature insulation during the vulcanization.

In order to as far as possible avoid defects on the tire surface, the air between the surface of the green tire and the shaping surface of the mold parts of the vulcanizing mold must be removed. For this purpose, it is generally known for 1000 to 5000 ventilation valves to be provided in the mold parts. By means of these ventilation valves, the air from the mold cavity is discharged radially and axially outward through ventilation channels. However, the mold parts of a new vulcanizing mold have to be equipped with these valves. Furthermore, these valves tend to become dirty owing to rubber that ingresses from the tire for vulcanization, such that said valves have to be exchanged or cleaned, which requires great outlay.

BRIEF SUMMARY OF THE INVENTION

The invention is based on the object of providing a heating press for vulcanizing a vehicle tire under a vacuum, with which vehicle tires can be reliably vulcanized under a vacuum and without the need for ventilation valves in the vulcanizing mold. It is likewise the object of the invention to provide a method for vulcanizing a vehicle tire under a vacuum in an efficient manner in terms of time.

The object is achieved in relation to the heating press in that a press plate is arranged above the container in the hood upper part such that this press plate and thus the container can be moved in an axial direction, the heating press upper part, the heating press lower part and the press plate are connected to the container such that, when the heating press upper part and the press plate are being lowered through a total stroke that takes place in the axial direction, in the course of which total stroke the open end of the hood upper part moves onto the heating press lower part, the mold parts of the vulcanizing mold can be closed in a radial direction, a vacuum-tight seal is arranged at least in the end face of a hood part, in the course of the first stroke, the hood upper part can be moved in such a way that it rests on the heating press lower part and the interior space of the hood can be closed in a vacuum-tight manner by the seals although the vulcanizing mold is still open in an air-permeable manner and a pump and a vacuum tank, by means of which a vacuum can be generated in the interior space of the hood after the first stroke, are provided, wherein the vacuum tank and the pump are connected to the interior space of the hood, and wherein the vacuum tank and the pump are connected to one another, and in the course of the second stroke, the container can be moved by the press plate in such a way that the vulcanizing mold can be completely closed under vacuum conditions in the interior space of the hood.

The vacuum that can be obtained inside the closed hood interior space after the first stroke serves to remove the air from the not-yet completely closed vulcanizing mold, in particular between the outer surface of the tire and the mold surfaces of the molding parts of the vulcanizing mold. After the second stroke, which takes place under vacuum conditions in the hood interior space and is performed by the additional press plate, which extends axially in the hood interior space between the upper side of the container and the hood upper part, the vulcanizing mold can be completely closed. The seal arranged in the end face of the hood upper part is only subjected to compressive load and therefore provides reliable and durable sealing. The tire for vulcanization can be manufactured with high quality and without defects.

It is furthermore essential that the vulcanizing mold itself has no ventilation means for ventilating the mold cavity. The 1000 to 5000 ventilation valves arranged in the vulcanizing mold in the prior art, through which ventilation valves the air from the mold cavity is discharged radially to the outside, are omitted by virtue of the vulcanization being performed under a vacuum. In this way, post-processing of the rubber flash that is formed on the tire by the ventilation means, and an exchange and/or cleaning of ventilation valves that are no longer functional, are no longer necessary. These are time-consuming and expensive. Furthermore, by virtue of the vulcanization being performed under a vacuum, the vulcanized tire takes on an external form which is absolutely free from defects and is thus of perfect appearance. Of course, to obtain a vacuum-tight hood interior space, the hood or heating press can have further seals. It is explicitly the intention that no modifications with regard to measures for providing air-tightness be made to the container or to the vulcanizing mold itself.

The term "vacuum" refers to air pressure in the range from 950 mbar (abs) to 0.1 mbar (abs).

The ring seal preferably has a round, polygonal or flat cross section.

It is expedient if a hydraulic, pneumatic or electric actuator, which can move the press plate in the axial direction, is provided.

In a certain embodiment of the invention, a hood lower part in the form of a circular ring is arranged on the heating press lower part, wherein the circular ring of the hood upper part and the circular ring of the hood lower part have the same inside diameter and the same outside diameter and are arranged in line with one another in the heating press. This results in very reliable sealing of the hood interior space.

It is expedient if the seal is a ring seal.

It is expedient for reliable sealing if the ring seal is arranged in a circular-ring-shaped groove, wherein the diameter of the ring seals is slightly greater than the depth of the groove. Slightly greater means that the seal, when installed into the groove and in the sealing state, is compressed by at most 40% in relation to the compression-free geometry of the seal. Through the exact design of the groove in relation to the seal geometry, damage to the seal(s) is additionally prevented and durability is improved.

In one embodiment of the invention, the ring seals consist of solid material. The solid material may consist of one or more materials that are known for seals, such as FKM or FFKM. These seals are inexpensive and easy to handle.

In another embodiment of the invention, the ring seal is a hose of variable diameter. This has the advantage that less load is exerted on the ring seal, and said ring seal is enlarged in terms of diameter only when the sealing action is necessary.

It is advantageous if the ring seals are differentially inflated double ring seals. This has the advantage that any leakage can be compensated with low levels of pump power.

It is expedient if the vacuum tank has a volume that is approximately 5 to 10 times greater than the volume of the closed hood (including mold, container, press plate, green tire, heating bellows). It is hereby ensured that a vacuum can be reliably generated in the hood. Furthermore, the time required for the generation of the required vacuum is significantly reduced. This may take place in the course of the normal loading and unloading process.

With regard to the method with an abovementioned heating press, the invention is achieved in that the following steps are performed in succession:
  a) loading the opened heating press by placing the green tire for vulcanization into the container,
  b) moving the heating press upper part through the first stroke in the axial direction toward the heating press lower part, until the end face of the hood upper part rests on the heating press lower part, in order to obtain a hood interior space which is closed in a vacuum-tight manner, while the vulcanizing mold is only closed to some extent,
  c) only if the ring seal is a hose of variable diameter: inflating the circular-ring-shaped hose seal in order to seal off the hood interior space in a vacuum-tight manner,
  d) opening the connection between the vacuum tank and the hood interior space in order to generate a partial vacuum, by way of pressure equalization between the vacuum tank and the hood interior space, in the hood interior space that has been closed in a vacuum-tight manner,
  e) when the partial vacuum is obtained in the hood interior space: closing the connection between the vacuum tank and the hood interior space, opening the connection between the hood interior space and the pump, and pumping the remaining air out of the hood interior space in order to generate the vacuum,
  f) moving the press plate in the heating press upper part through the second stroke, in the course of which the container is moved in such a way that the vulcanizing mold is completely closed, and subsequently closing the connection between the hood interior space and the pump,
  g) vulcanizing the green tire and opening the connection between the pump and the vacuum tank and generating a vacuum in the vacuum tank, wherein the connection of the pump to the hood interior space and the connection of the vacuum tank to the hood interior space are each closed,
  h) opening the heating press and unloading the fully vulcanized tire, and repeating the steps a)-h) in order to vulcanize each further tire.

It is advantageous if, to facilitate step h), this is preceded by a further valve arranged in the hood being opened in order to deplete the vacuum in the hood and subsequently being closed again.

BRIEF DESCRIPTION OF THE SEVERAL VIEWS OF THE DRAWINGS

An exemplary embodiment of a heating press and the method for vacuum vulcanization of a pneumatic vehicle tire, together with further advantages, will be described on the basis of the following schematic FIGS. 1 to 4. In the figures.

DETAILED DESCRIPTION OF THE INVENTION

Figure 1:
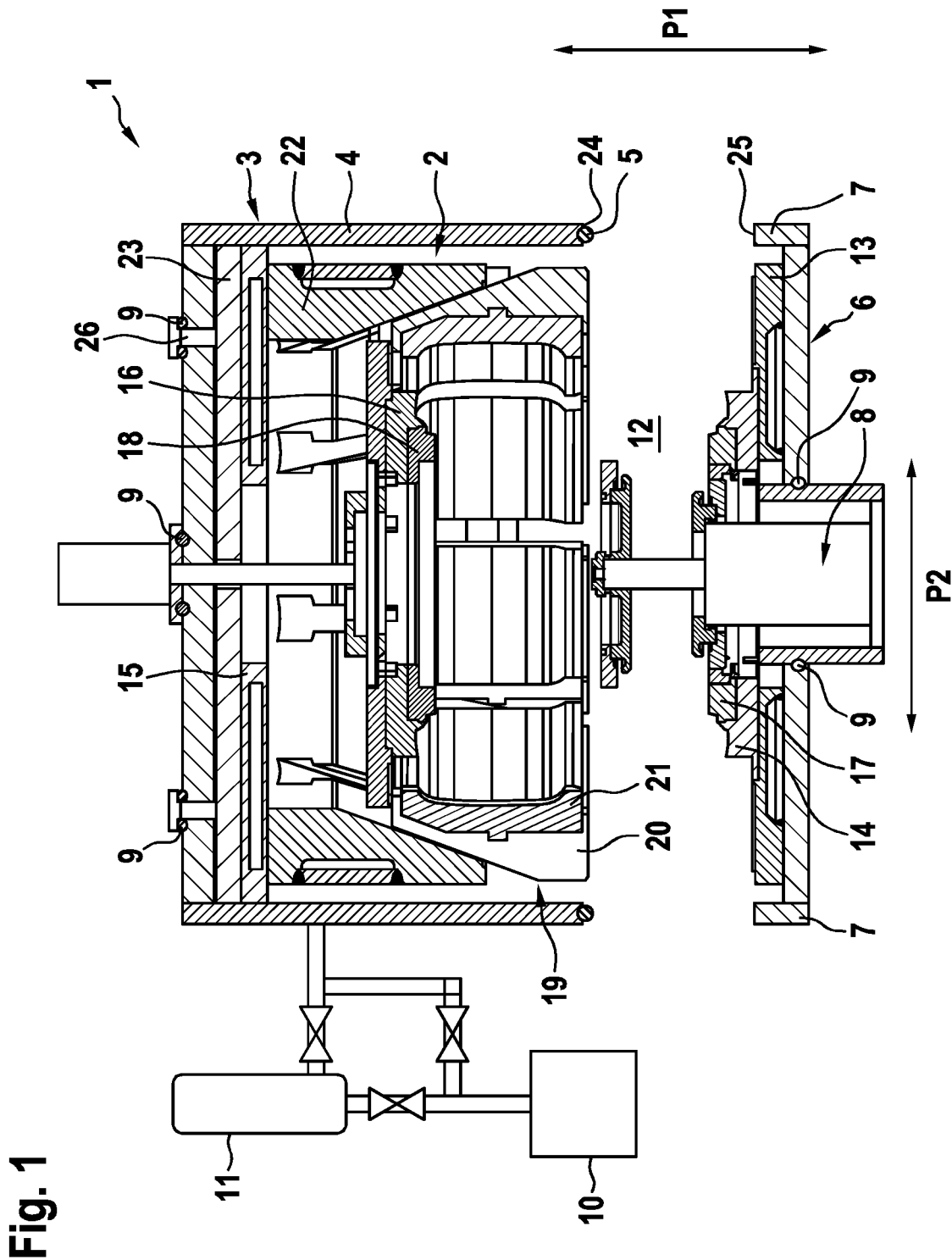
FIG. 1 shows a heating press according to the invention with a container in the open state.

FIG. 1 shows a heating press 1 according to the invention with a container 2 in the open state. The green tire can be placed into the heating press 1.

The heating press 1 comprises a heating press upper part 3, which is connected to a circular-ring-shaped hood upper part 4, and a heating press lower part 6, which is connected to a circular-ring-shaped hood lower part 7 and has the corresponding mechanisms for positioning the tire for vulcanization, for actuating the constituent parts of the vulcanizing mold, for introducing the heating media, and for removing the fully vulcanized tire. A press plate 23 is arranged above the container 2 in the hood upper part 4 such that this press plate 23 and thus the container 2 can be moved in the axial direction P1. During the vulcanization operation, the container 2 is enclosed by the hood 4, 7. The circular-ring-shaped hood upper part 4 and the circular-ring-shaped hood lower part 7 have the same inside diameter and the same outside diameter and are arranged with their end faces 24, 25 in line in the heating press 1.

A "central mechanism" 8 is provided. This is likewise charged with seals 9—to the extent necessary—in order to establish vacuum-tightness between the central mechanism and the heating press upper and lower parts 3, 6. A heating bellows (not illustrated) that can be placed into the green tire (not illustrated) is fastened to the central mechanism 8. Furthermore, nozzles (not illustrated) are arranged on the central mechanism 8, through which nozzles a heating medium can be introduced into the heating bellows (not illustrated).

The hood upper part 4 and the hood lower part 7 are airtight, or vacuum-tight, and in the closed state form a vacuum-tight hood interior space 12. In order to seal the end faces 24, 25 of the two hoods 4, 7 in a vacuum-tight manner in the closed state, a ring seal 5 is arranged in the end face 24 of the hood upper part 4. Further ring seals 9 seal off the central mechanism and the movement arrangement/actuator 26 of the press plate 23 in a vacuum-tight manner.

A vacuum can be generated in the hood interior space (=interior space of the hood) 12 by means of a pump 10 and a vacuum tank 11, wherein the vacuum tank 11 and the pump 10 are connected to the interior space 12 of the hood, and wherein the vacuum tank 11 and the pump 10 are connected to one another. By virtue of a vacuum being provided in the hood interior space 12, in particular during the molding and the vulcanization of the tire, conventional ventilation valves arranged in the mold face of the vulcanizing mold are omitted entirely.

The container 2 is a conventional container 2 that is already known in the prior art.

The container 2 contains the segmented vulcanizing mold with a lower heating plate 13, a lower sidewall shell 14, an upper heating plate 15, an upper sidewall shell 16, a lower bead ring 17 and an upper bead ring 18. Those constituent parts of the vulcanizing mold that are moved in a vertical (=axial) direction (arrow P1) for the purposes of opening and closing include the segment ring 19, composed of seven to nine segment shoes 20, and the profile/mold segments 21 fastened thereto and also the upper sidewall shell 16 with the upper bead ring 18. The segment shoes 20 are moved apart radially, in the direction of the arrow P2, to close and open the vulcanization mold. On the upper heating plate 15, there is arranged a closing ring 22 which has a beveled inner surface which interacts with beveled outer surfaces of the segment shoes 20 of the segment ring 19 such that, during the closing of the vulcanizing mold, the segment shoes 20 are moved together in a radial direction to form the closed segment ring 19. In the lower heating plate 13, the upper heating plate 15 and in the closing ring 22, there are incorporated heating chambers into which at least one heating medium, in particular saturated steam (water vapor), is introduced for the vulcanization of the tire. In this way, the green tire (not illustrated) is heated from the outside via the segment shoes 20, the sidewall shells 14, 16 and the bead rings 17, 18, such that this heating is commonly referred to as external heating.

A conventional heating bellows (not illustrated) is provided in a known manner and is filled with at least one pressurized heating medium in order to center the green tire in the mold from the inside, wherein the heating bellows is brought into a toroidal shape conforming to a tire. Since the green tire is heated by means of the heating bellows from the inside, this type of heating is referred to as internal heating.

Figure 2:
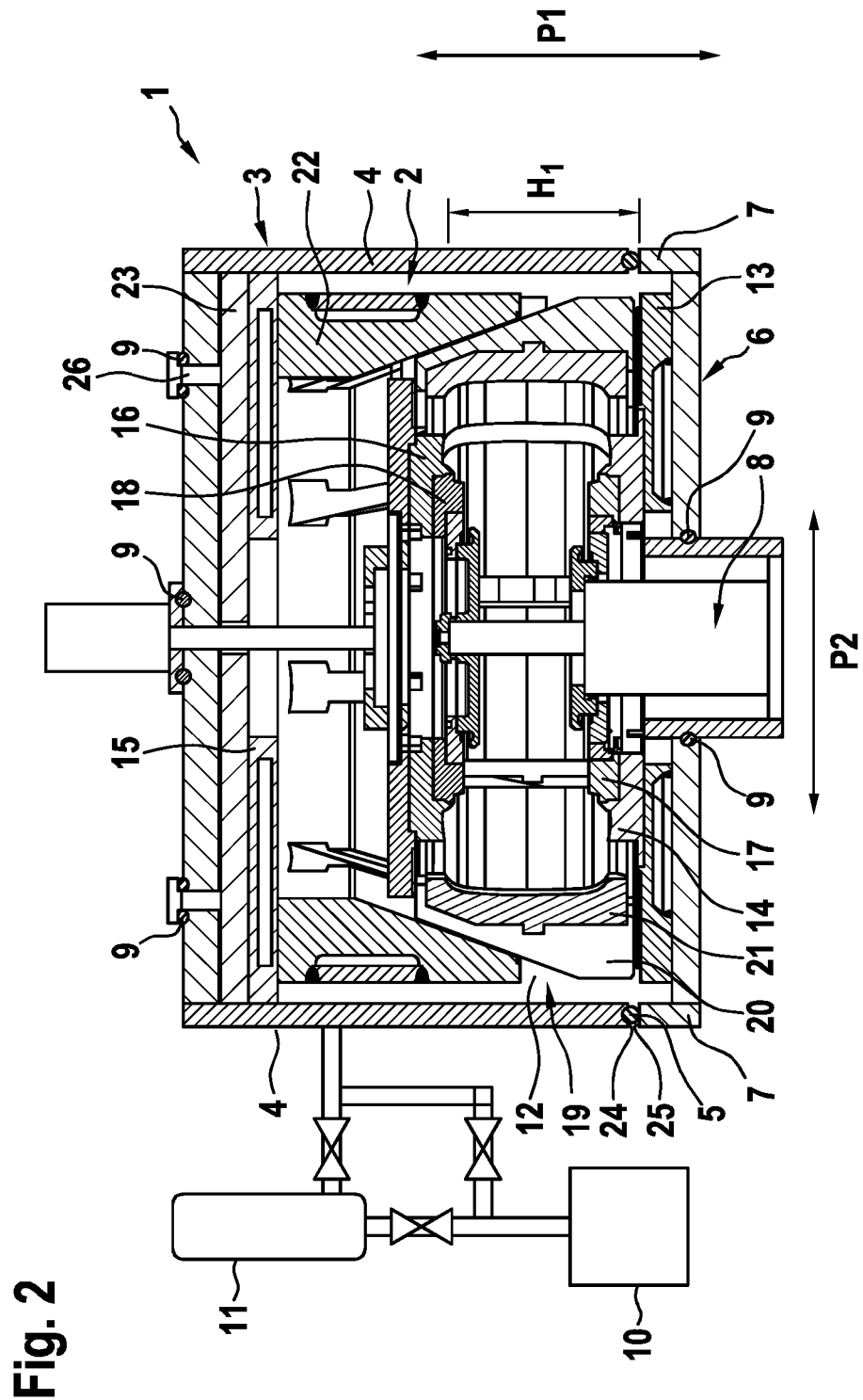
FIG. 2 shows the heating press of FIG. 1 in the closing phase after a first stroke.

FIG. 2 illustrates the heating press 1 of FIG. 1 in the closing phase after a first stroke $H_1$.

The heating press upper part 3 is moved through the first stroke $H_1$, with the result that the end face 24 of the hood upper part 4 rests on the end face 25 of the hood lower part 7. The press plate in the hood upper part is still in its original position and thus has not yet been moved. A closed, vacuum-tight hood interior space 12 is obtained, while the vulcanization mold is closed only to some extent. If the ring seal 5 is a hose of variable diameter, it is inflated in order to seal off the hood 4, 7 in a vacuum-tight manner. The connection between the vacuum tank 11 and the hood interior space 12 is opened in order to generate a partial vacuum, by way of pressure equalization between the vacuum tank 11 and the hood interior space 12, in the hood interior space 12 that has been closed in a vacuum-tight manner. When the partial vacuum has been generated in the hood interior space 12, the connection between the vacuum tank 11 and the hood 4, 7 is closed, the connection between the hood interior space 12 and the pump 10 is opened and the remaining air is pumped out of the hood interior space 12 to generate the vacuum.

Figure 3:
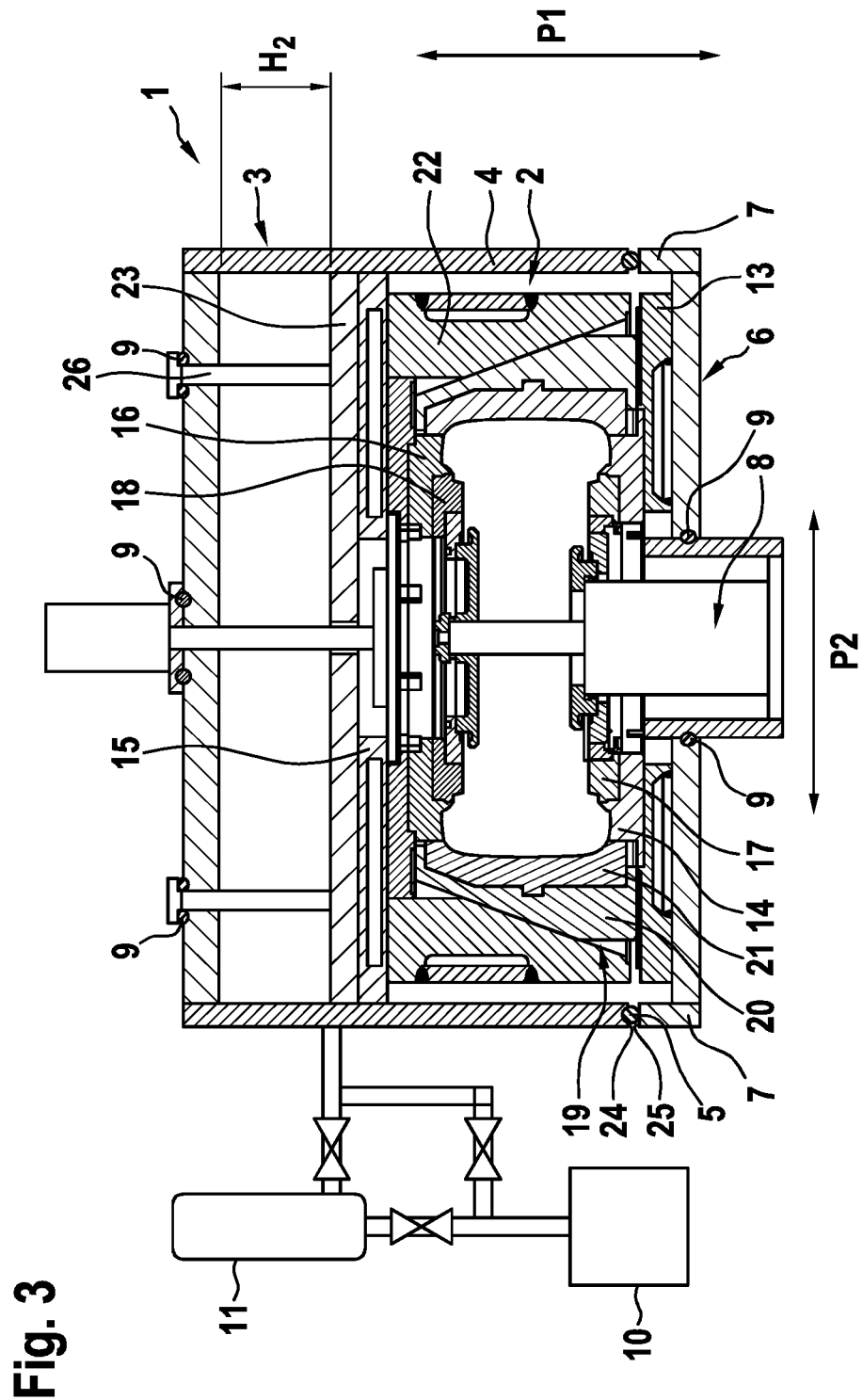
FIG. 3 shows the heating press of FIG. 1 and FIG. 2 in the closed state after a second stroke.

FIG. 3 shows the heating press of FIG. 1 and FIG. 2 in the closed state after a second stroke H2. After a vacuum has been generated in the interior space 12 of the closed hood 4, 7 of FIG. 2, the performance of a second stroke H2, in the course of which the press plate 23 moves the container 2 in the axial direction P1 by means of an actuator 26, then causes the vulcanizing mold, which has been evacuated of air, to be completely closed and the connection between the vacuum tank 11 and the hood 4, 7 to be closed.

Then, the connection between the hood interior space 12 and the pump 10 is closed. The green tire is vulcanized.

In the case of a passenger motor vehicle tire, the vulcanization thereof takes approximately 15 minutes. During this time, the connection between pump 10 and vacuum tank 11 is opened in order to generate a vacuum in the vacuum tank 11, wherein the connection of the pump 10 to the hood 4, 7 and the connection of the vacuum tank 11 to the hood 4, 7 are each closed. After the vulcanization of the tire is complete, the volume of the hood interior space 12 is aerated via a valve (not illustrated), and the heating press 1 is opened in order to unload the fully vulcanized tire from the container 2 having the vulcanizing mold. For this purpose, the press plate 23 with the container 2 firstly moves upward, and the profile segments 21 are simultaneously moved outward in the radial direction P2. Then, the hood upper part 4 rises and the tire is released.

The invention claimed is:

1. A heating press for a tire, the heating press comprising:
a heating press upper part;
a heating press lower part;
a circular-ring-shaped hood upper part of a hood of the heating press upper part, the hood upper part having a container and mold parts of a segmented vulcanization mold in the container, wherein the heating press upper part is movable in an axial direction (P1) in such a way that the hood upper part is movable onto the heating press lower part to form a closed hood interior space;
a press plate arranged above the container in the hood upper part and moveable in the axial direction (P1);
at least one seal configured to establish vacuum-tightness between the heating press upper part and the heating press lower part;
a pump configured to generate a vacuum in the closed hood interior space;
the mold configured to be filled with a pressurized heating medium for a green tire and heated by internal heating;
wherein the heating press upper part is movable together with the press plate in the axial direction (P1) in to a first stroke (H1) so that the heating press upper part sits on the heating press lower part and the hood interior space is closed vacuum tight via the at least one seal, while the vulcanizing mold is open in an air-permeable manner; and
wherein the press plate is movable in the axial direction (P1) in a second stroke so that the mold parts move in a radial direction to completely close the vulcanizing mold under vacuum in the closed hood interior space.

2. The heating press of claim 1, wherein a hydraulic, pneumatic or electric actuator (26), which can move the press plate in the axial direction (P1), is provided.

3. The heating press of claim 1, wherein a hood lower part (7) in the form of a circular ring is arranged on the heating press lower part (6), wherein the circular ring of the hood upper part (3) and the circular ring of the hood lower part (7)

have the same inside diameter and the same outside diameter and are arranged in line with one another in the heating press (1).

4. The heating press of claim 1, wherein the seal is a ring seal (5, 9).

5. The heating press of claim 4, wherein the ring seal (5, 9) is arranged in a circular-ring-shaped groove, wherein a diameter of the ring seal (5, 9) is slightly greater than a depth of the groove.

6. The heating press of claim 4, wherein the ring seals (5, 9) consist of solid material.

7. The heating press of claim 4, wherein the ring seal (5, 9) is a hose of variable diameter.

8. The heating press of claim 4, wherein the ring seal (5, 9) is a differentially inflated double ring seal.

9. The heating press of claim 1, wherein the vacuum tank (11) has a volume that is approximately 5 to 10 times greater than a volume of the closed hood.

10. A method for vulcanizing a pneumatic vehicle tire under a vacuum in a heating press, the method comprising:
providing the heating press according to claim 1, and operating the heating press including the steps:
  a) loading the heating press when opened by placing a green tire for vulcanization into the container (2),
  b) moving the heating press upper part (3) through the first stroke (H1) in the axial direction (P1) toward the heating press lower part (6), until an end face (24) of the hood upper part (4) rests on the heating press lower part (6), obtain the hood interior space (12) which is closed in a vacuum-tight manner, while the vulcanizing mold is only closed to some extent,
  d) opening the connection between a vacuum tank (11) and the hood interior space (12) in order to generate a partial vacuum, by way of pressure equalization between the vacuum tank (11) and the hood interior space (12), in the hood interior space (12) that has been closed in a vacuum-tight manner,
  e) when the partial vacuum is obtained in the hood interior space (12): closing the connection between the vacuum tank (11) and the hood interior space (12), opening the connection between the hood interior space (12) and the pump (10), and pumping the remaining air out of the hood interior space (12) in order to generate the vacuum,
  f) moving the press plate in the heating press upper part (3) through the second stroke (H2), in the course of which the container (2) is moved in such a way that the vulcanizing mold is completely closed, and subsequently closing the connection between the hood interior space (12) and the pump (10),
  g) vulcanizing the green tire and opening the connection between the pump (10) and the vacuum tank (11) and generating a vacuum in the vacuum tank (11), wherein the connection of the pump (10) to the hood interior space (12) and the connection of the vacuum tank (11) to the hood interior space (12) are each closed,
  h) opening the heating press (1) and unloading the fully vulcanized tire, and repeating the steps a)-h) in order to vulcanize each further tire.

11. The method for vulcanizing a pneumatic vehicle tire as claimed in claim 10, further comprising: to facilitate step h), this is preceded by opening a further valve arranged in the hoods in order to deplete the vacuum and subsequently closing it again.

\* \* \* \* \*